(12) United States Patent
Ruzicka

(10) Patent No.: US 7,793,459 B1
(45) Date of Patent: Sep. 14, 2010

(54) FISHING HOOK THREADER AND HOLDER

(76) Inventor: Emil Ruzicka, 2409 W. Carroll, Oak Creek, WI (US) 53154

( * ) Notice: Subject to any disclaimer, the term of this patent is extended or adjusted under 35 U.S.C. 154(b) by 0 days.

(21) Appl. No.: 12/711,973

(22) Filed: Feb. 24, 2010

Related U.S. Application Data

(60) Provisional application No. 61/220,476, filed on Jun. 25, 2009.

(51) Int. Cl.
*A01K 91/04* (2006.01)
(52) U.S. Cl. .................. 43/44.83; 43/57.1; 43/42.49
(58) Field of Classification Search ............... 43/44.83, 43/57.1, 4, 43.16, 42.49; 223/99; 112/225, 112/224
See application file for complete search history.

(56) References Cited

U.S. PATENT DOCUMENTS

| 2,682,126 | A | * | 6/1954 | Shepherd | ............... 269/254 CS |
| 3,066,372 | A | * | 12/1962 | Parker | ................... 403/209 |
| 3,357,086 | A | * | 12/1967 | Hood | .................... 29/241 |
| 4,573,719 | A | * | 3/1986 | Aldridge | .................. 289/17 |
| 4,697,370 | A | | 10/1987 | Vissing | |
| 6,041,541 | A | * | 3/2000 | Davis | .................. 43/44.83 |
| 6,625,921 | B2 | | 9/2003 | Friederichs, III | |
| 2001/0039754 | A1 | * | 11/2001 | Friederichs, III | ........... 43/43.16 |
| 2007/0193104 | A1 | * | 8/2007 | Molyneux | .................. 43/4 |
| 2009/0241407 | A1 | * | 10/2009 | Eisbrenner | ................... 43/25 |

* cited by examiner

Primary Examiner—Christopher P Ellis
(74) Attorney, Agent, or Firm—Donald J. Ersler

(57) ABSTRACT

A fishing hook threader and holder includes a threader body and a hook holder projection. A conical shaped opening is formed in a top of the threader body at substantially one end. The entrance opening has a greater perimeter than the exit opening. A line bore is formed through the exit opening and is substantially concentric therewith. A line removal slit is formed through a wall of the line bore. A jig clearance notch is formed adjacent the line bore. In use, a line loop of the fishing hook, a jig hook or fly hook is inserted into the line removal slit, such that the line loop is in contact with the line bore. A fishing line is inserted through the conical shaped opening and the line bore. The fishing hook and fishing line are removed from the fishing hook threader by pulling thereof out of the line removal slit.

16 Claims, 11 Drawing Sheets

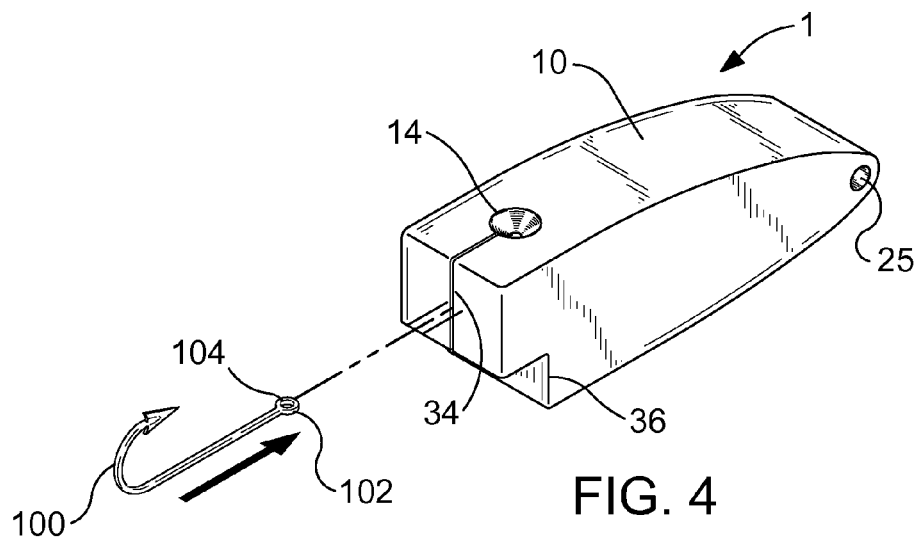
FIG. 4
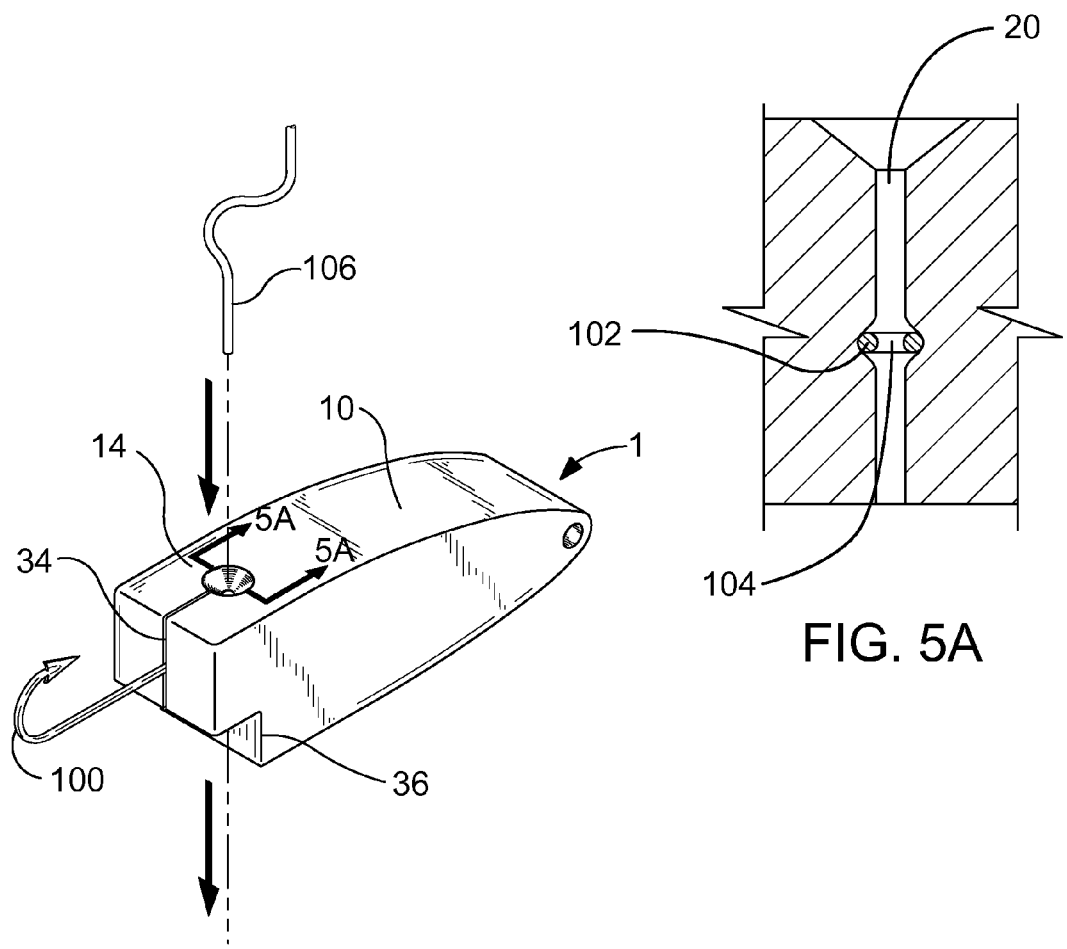
FIG. 5
FIG. 5A

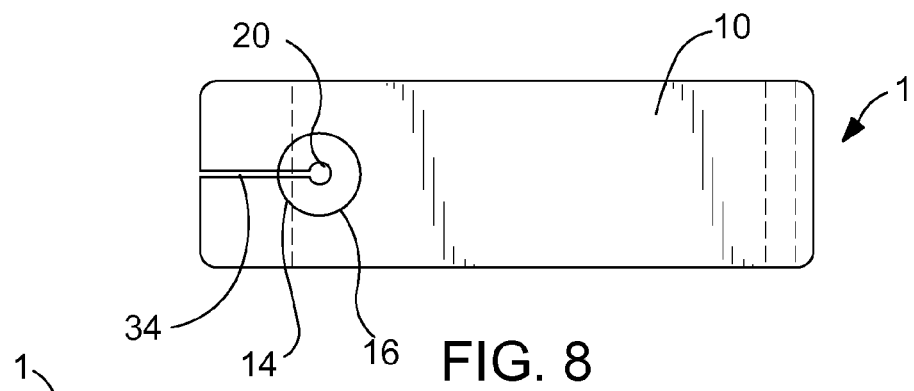
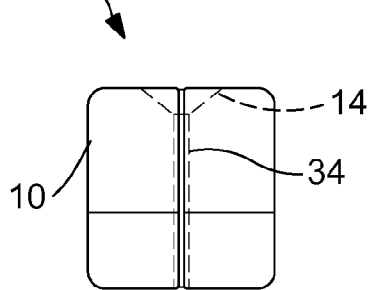
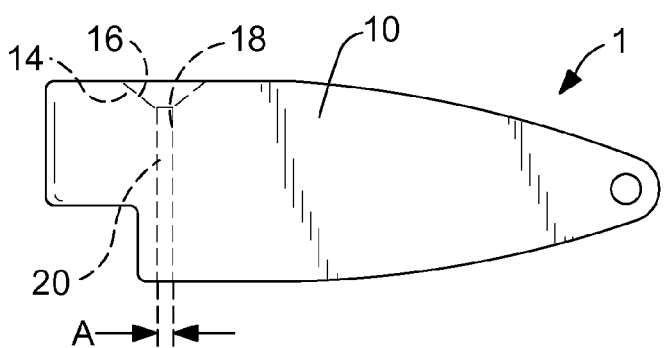
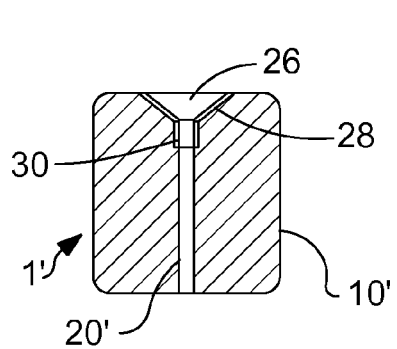
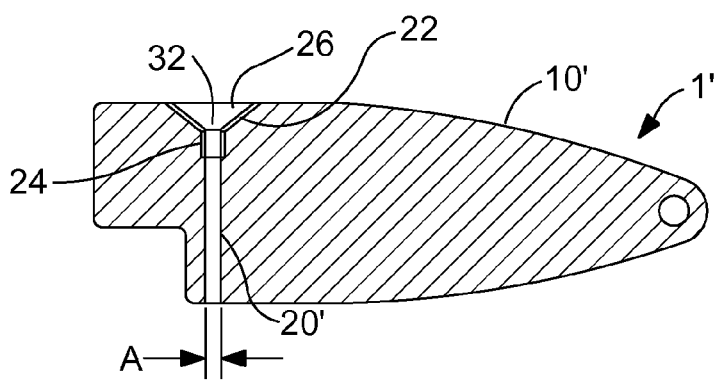
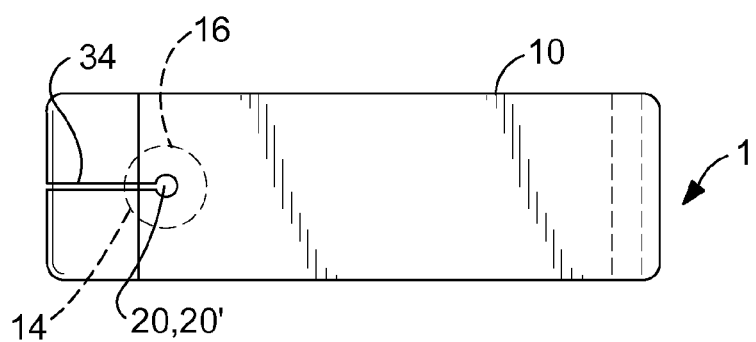

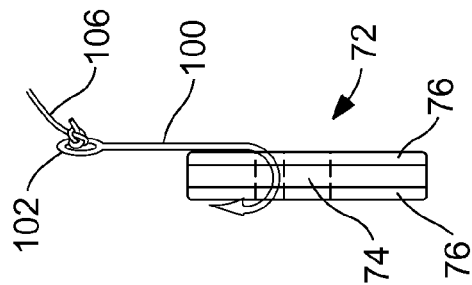
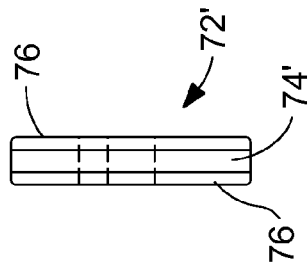
FIG. 23
FIG. 25
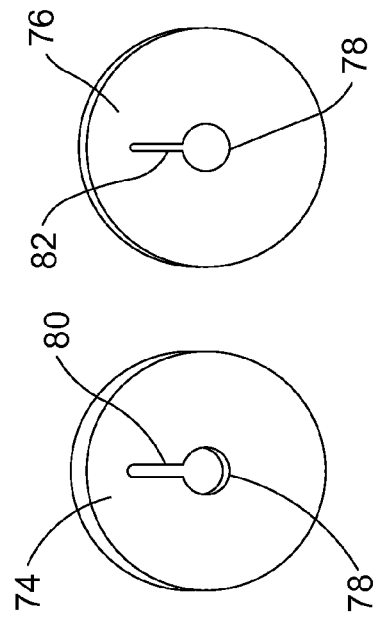
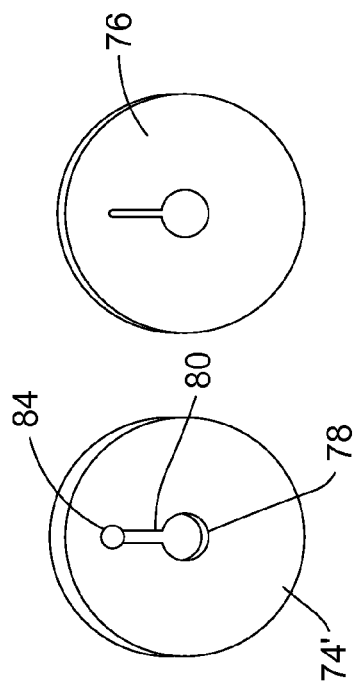
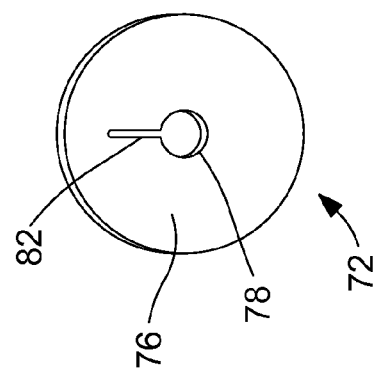
FIG. 22
FIG. 24

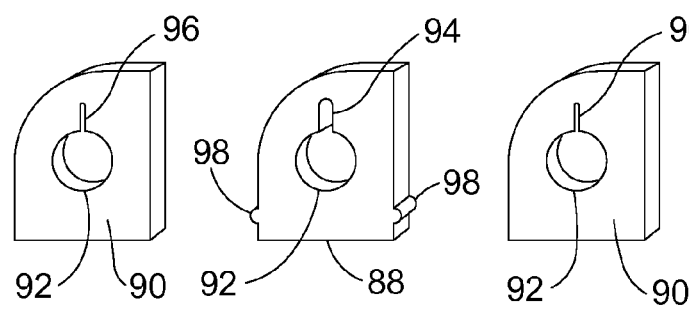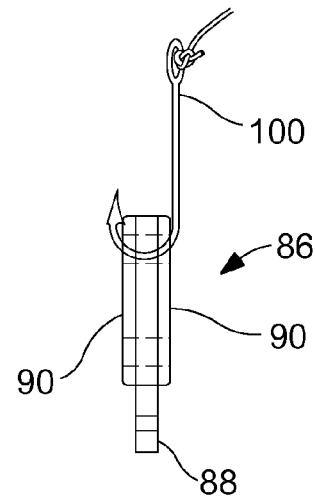
FIG. 26    FIG. 27
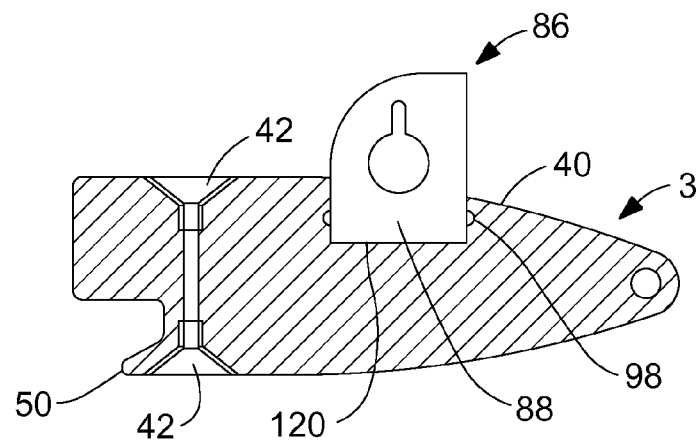
FIG. 28
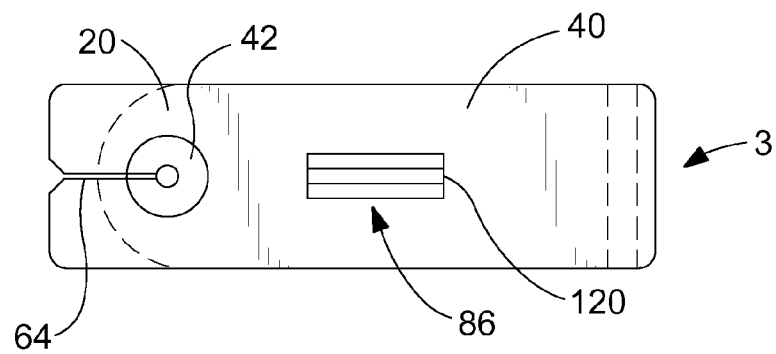
FIG. 29

FISHING HOOK THREADER AND HOLDER

CROSS-REFERENCES TO RELATED APPLICATIONS

This is a nonprovisional application taking priority from provisional application No. 61/220,476 filed on Jun. 25, 2009.

BACKGROUND OF THE INVENTION

1. Field of the Invention

The present invention relates generally to threading fishing hooks and more specifically to a fishing hook threader and holder, which allows fishing hooks to be quickly and easily threaded and held for tying.

2. Discussion of the Prior Art

U.S. Pat. No. 4,697,370 to Vissing discloses a fishhook threader. The Vissing patent includes a fishhook threader for threading a leader through the eye of a fish hook. U.S. Pat. No. 6,041,541 to Davis discloses a fishing line threader. The Davis patent includes a fishing hook threading mechanism that can be temporarily attached to a fishhook eye to allow a user to easily and quickly thread a fishhook. U.S. Pat. No. 6,625,921 to Friederichs discloses a fishhook threader. The Friederichs patent includes a fishing device having a wall, the wall defining a large opening, a small opening and a slit, the large opening operably communicating with the small opening through the slit. A fishing hook being inserted into the slit, adjacent the small opening.

Accordingly, there is a clearly felt need in the art for a fishing hook threader and holder, which allows fishing hooks, jigs and fly hooks to be quickly and easily threaded and held for tying.

SUMMARY OF THE INVENTION

The present invention provides a fishing hook threader and holder, which allows fishing hooks to be quickly and easily threaded and held for tying. A fishing hook threader and holder includes a threader body and a hook holder projection. A conical shaped opening is formed in a top of the threader body at substantially one end. The conical shaped opening includes an entrance opening and exit opening. The entrance opening has a greater perimeter than the exit opening. A line bore is formed through the exit opening and is concentric therewith. The line bore is equal to substantially double a diameter of a fishing line inserted therein. A jig projection may be extended from a bottom of the threader body to provide support for a second conical shaped opening.

A line removal slit is formed through a wall of the line bore. A jig clearance notch is formed in a front of the threader body, below the conical shaped opening. A depth of the jig clearance notch provides a wall thickness between the line bore and the jig clearance notch, which is equal to at least one diameter of the line bore. In use, a line loop of the fishing hook, a jig hook or fly hook is inserted into the line removal slit, such that the line loop is in contact with the a rear of the line bore. A fishing line is inserted through the conical shaped opening and the line bore. After the line is inserted through the line bore, the fishing hook, jig hook or fly hook and fishing line are removed from the fishing hook threader by pulling thereof through the line removal slit.

A fishing hook holder preferably includes a base plate and two resilient outer layers. One of the two outer layers is attached to one side of the base plate and the other one of the two outer layers is attached to the other side of the base plate. A hook opening is formed through the base plate and the two outer layers. A base slot extends from a perimeter of hook opening in the base plate to provide clearance for the fishing hook. An outer slit extends from a perimeter of hook opening in each outer layer to provide an interference fit with the fishing hook. The base plate is preferably a magnetized material, such as steel or a refrigerator type magnet. An end of the base slot may be terminated with a neodymium magnet.

A hook holder projection preferably extends from a top of the threader body. The hook holder projection preferably includes a base plate and two resilient outer layers. A hook opening is formed through the base plate and the two outer layers. A base slot extends from a perimeter of hook opening in the base plate to provide clearance for the fishing hook. An outer slit extends from a perimeter of hook opening in the outer layer to provide an interference fit with the fishing hook. The base plate is preferably a magnetized material, such as steel. The hook holder projection is inserted into the fish hook threader.

A fishing hook threader with an integral hook holder includes a threader body and a retention pin. A hook opening is formed through a top of the threader body. A hook slit is cut from an end of the threader body through the hook opening. The retention pin is inserted substantially perpendicular to the hook opening and adjacent thereto. A fishing hook is inserted into the hook bore and pulled back against the retention pin and retained in the hook slit.

Accordingly, it is an object of the present invention to provide a fishing hook threader and holder, which allows fishing hooks, jigs and fly hooks to be quickly and easily threaded.

Finally, it is another object of the present invention to provide a fishing hook threader and holder, which allows a hook to be held for tying a fishing line knot thereto.

These and additional objects, advantages, features and benefits of the present invention will become apparent from the following specification.

BRIEF DESCRIPTION OF THE DRAWINGS

FIG. 4 is a front perspective view of a fishing hook threader and a fishing hook before insertion into the fishing hook threader in accordance with the present invention.

FIG. 5 is a front perspective view of a fishing hook threader, a fishing hook inserted into the fishing hook threader and a fishing line before insertion into the fishing hook threader in accordance with the present invention.

FIG. 5a is a cross sectional view of a line bore of a fishing hook threader with a hook inserted therein cut through FIG. 5 in accordance with the present invention.

FIG. 8 is a top view of a fishing hook threader in accordance with the present invention.

FIG. 9 is a front view of a fishing hook threader in accordance with the present invention.

FIG. 9a is a cross sectional front view of a fishing hook threader with a conical shaped insert retained therein in accordance with the present invention.

FIG. 10 is a side view of a fishing hook threader in accordance with the present invention.

FIG. 10a is a cross sectional side view of a fishing hook threader with a conical shaped insert retained therein in accordance with the present invention.

FIG. 11 is a bottom view of a fishing hook threader in accordance with the present invention.

FIG. 22 is an exploded perspective view of a fishing hook holder in accordance with the present invention.

FIG. 23 is an end view of a fishing hook holder in accordance with the present invention.

FIG. 24 is an exploded perspective view of a second embodiment of a fishing hook holder in accordance with the present invention.

FIG. 25 is an end view of a second embodiment of a fishing hook holder in accordance with the present invention.

FIG. 26 is an exploded perspective view of a fishing hook holder projection for a fishing hook threader in accordance with the present invention.

FIG. 27 is an end view of a fishing hook holder projection for a fishing hook threader in accordance with the present invention.

FIG. 28 is a cross sectional side view of a fishing hook holder projection inserted into a fishing hook threader in accordance with the present invention.

FIG. 29 is a top view of a fishing hook holder projection inserted into a fishing hook threader in accordance with the present invention.

DETAILED DESCRIPTION OF THE PREFERRED EMBODIMENTS

Figure 1:
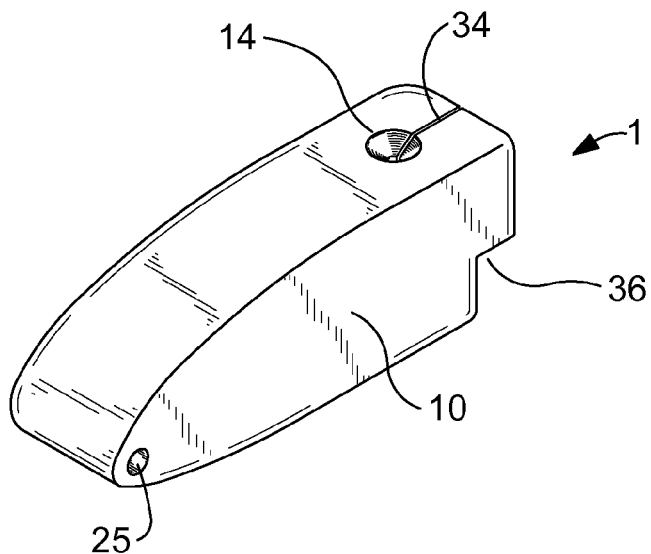
FIG. 1 is a rear perspective view of a fishing hook threader in accordance with the present invention.
Figure 2:
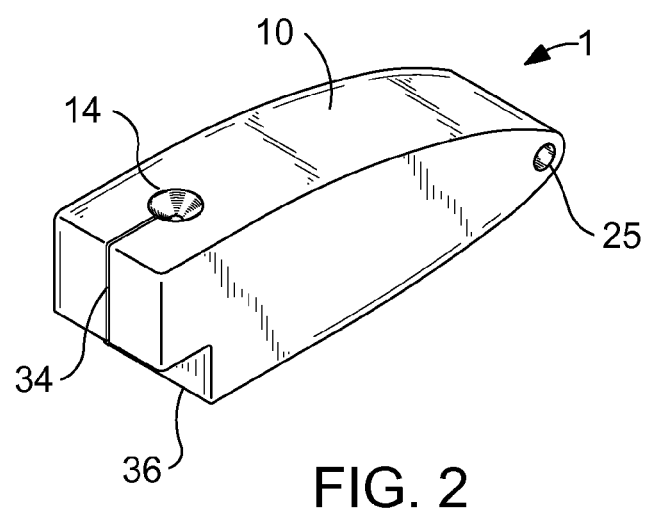
FIG. 2 is a front perspective view of a fishing hook threader in accordance with the present invention.
Figure 3:
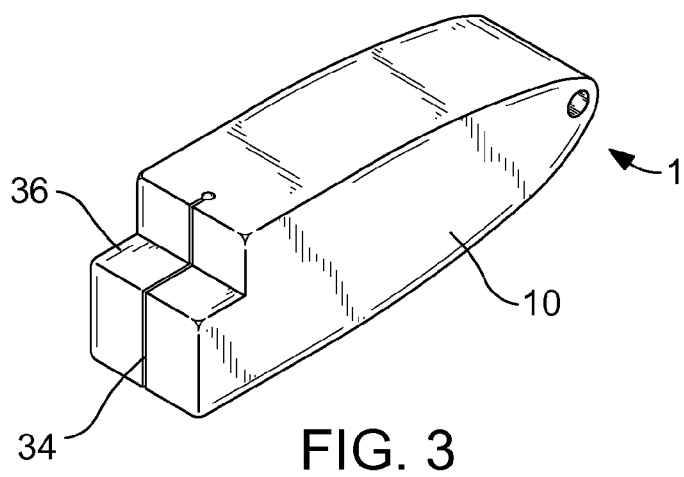
FIG. 3 is a front bottom perspective view of a fishing hook threader in accordance with the present invention.

With reference now to the drawings, and particularly to FIG. 1, there is shown a rear perspective view of a fishing hook threader 1. With reference to FIGS. 2-3, the fishing hook threader 1 includes a threader body 10. The threader body 10 is fabricated from a material having memory, such as a rubber or a closed cell foam material, but other materials may also be used. It is also preferable that the fishing hook threader 1 be fabricated of material that floats in water. A shape of the threader body 10 should not be limited to that shown in the figures, but should include any appropriate shape. With reference to FIGS. 8-11, a conical shaped opening 14 is formed in a top of the threader body 10 at substantially one end. The conical shaped opening 14 includes an entrance opening 16 and exit opening 18. The entrance opening 16 has a greater perimeter than the exit opening 18. A line bore 20 is formed through the exit opening 18 and is concentric therewith. With reference to FIGS. 4-5a, a diameter "A" of the line bore 20 is equal to substantially double a diameter of a fishing line inserted therein.

A conical shaped opening 22 and a concentric counterbore 24 may be formed in a threader body 10' of a fishing hook threader 1' to receive a conical shaped insert 26. The conical shaped insert 26 includes a funnel portion 28 and a cylindrical portion 30. An inner diameter 32 of the cylindrical portion 30 is substantially the same size as the line bore 20. The cylindrical portion 30 helps to align a fishing line 106 inserted through the conical shaped insert 26 and prevents the fishing line 106 from hitting an inner perimeter 104 of the line loop 102 or the line loop 102 in FIG. 5a.

Figure 6:
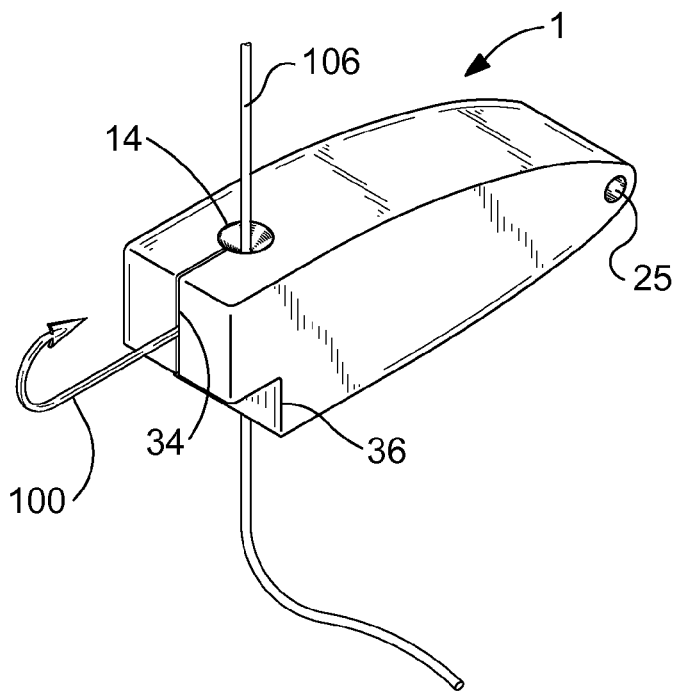
FIG. 6 is a front perspective view of a fishing hook threader, a fishing hook inserted into the fishing hook threader and a fishing line inserted into the fishing hook threader in accordance with the present invention.
Figure 7:
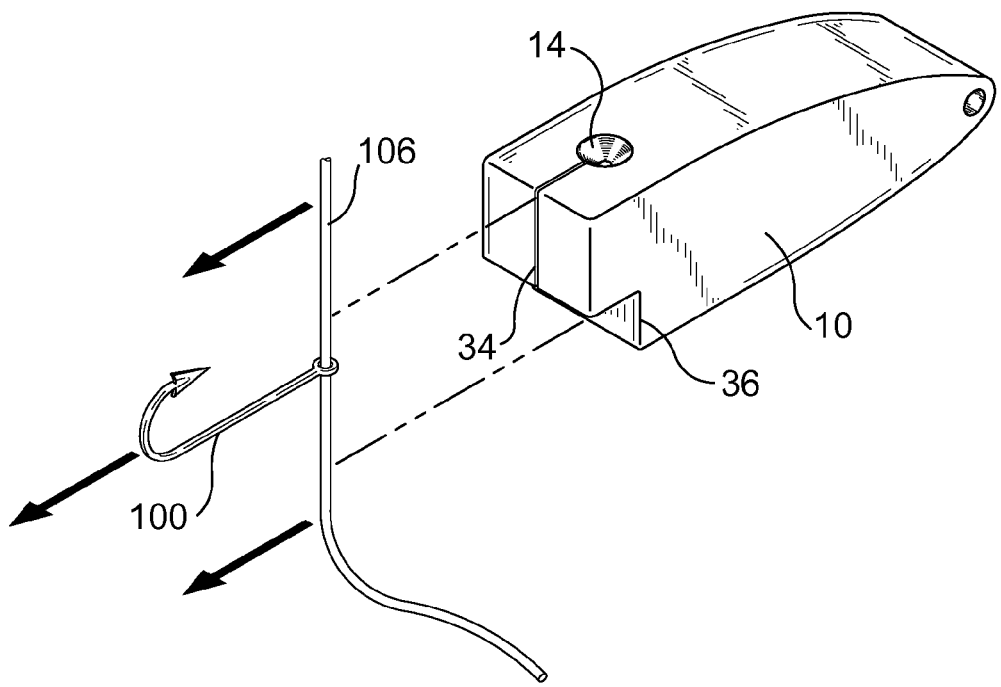
FIG. 7 is a front perspective view of a fishing hook threader and a threaded fishing hook after removal from the fishing hook threader in accordance with the present invention.
Figure 12:
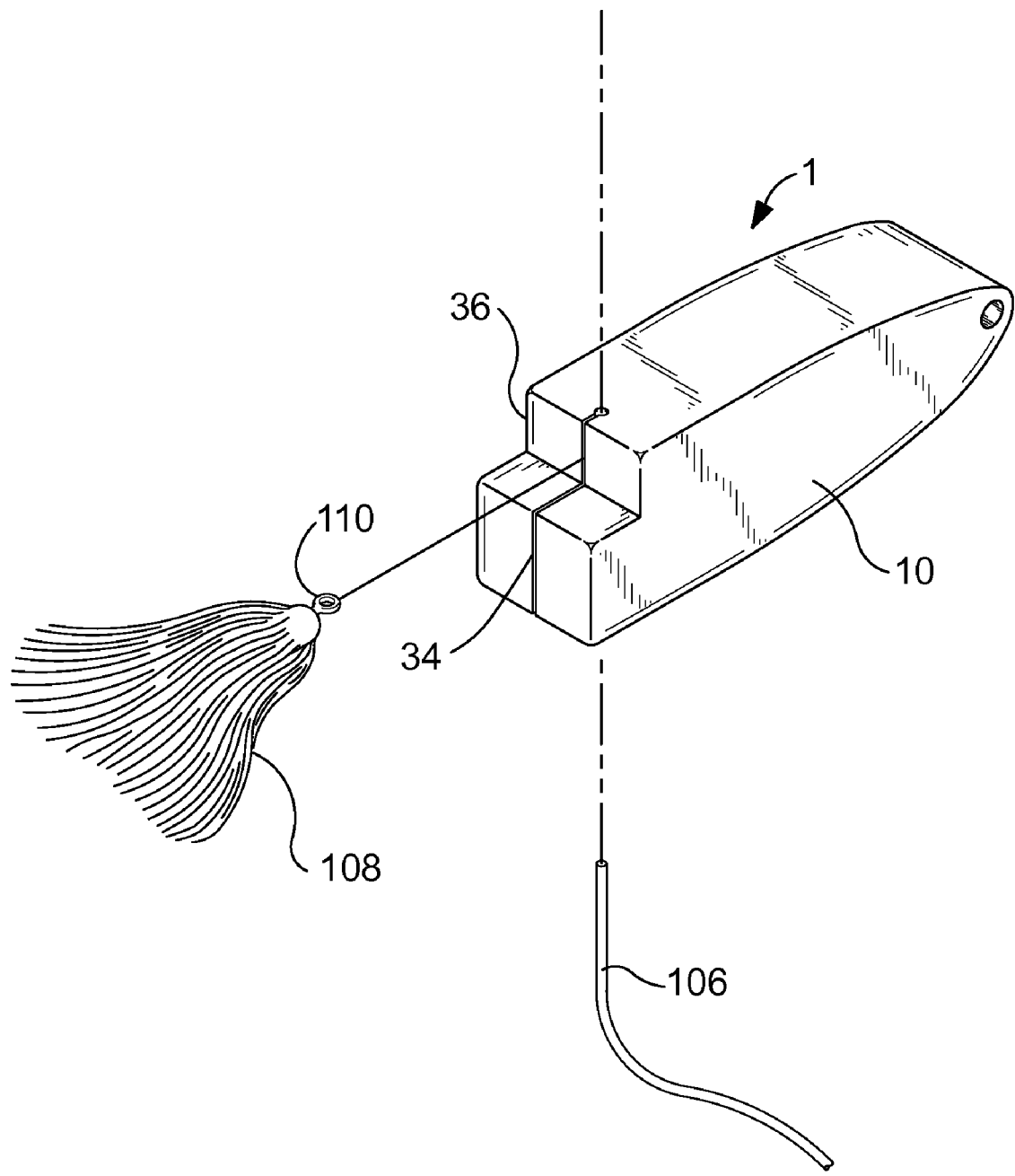
FIG. 12 is a bottom perspective view of a fishing hook threader, a fly hook before insertion into the fishing hook threader and a fishing line before insertion into the fishing hook threader in accordance with the present invention.
Figure 13:
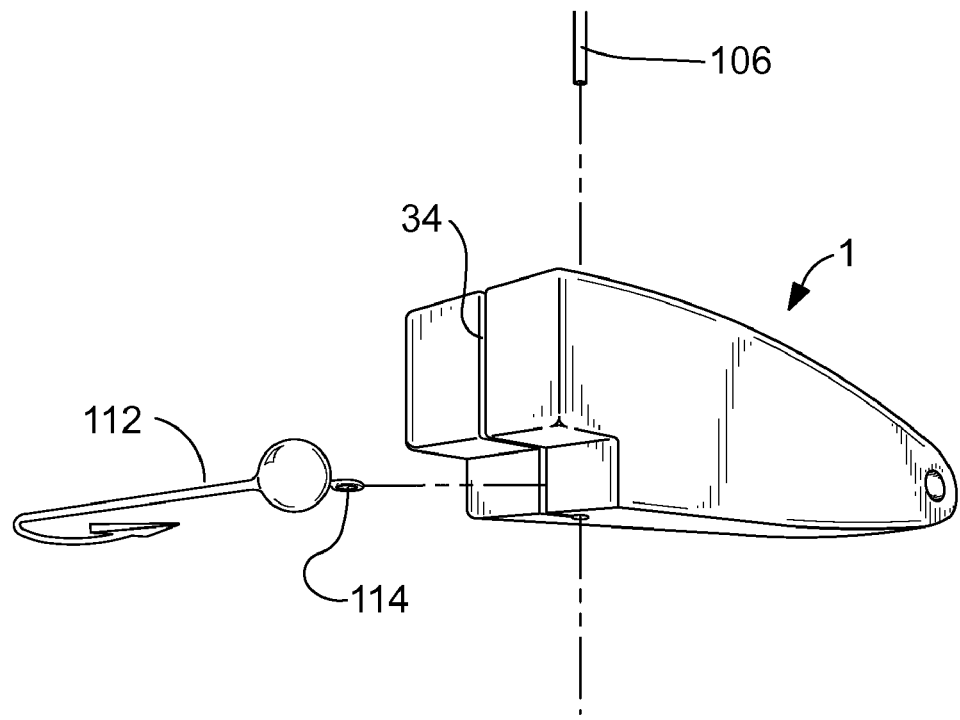
FIG. 13 is a perspective view of a fishing hook threader, a jig before insertion into the fishing hook threader and a fishing line before insertion into the fishing hook threader in accordance with the present invention.
Figure 14:
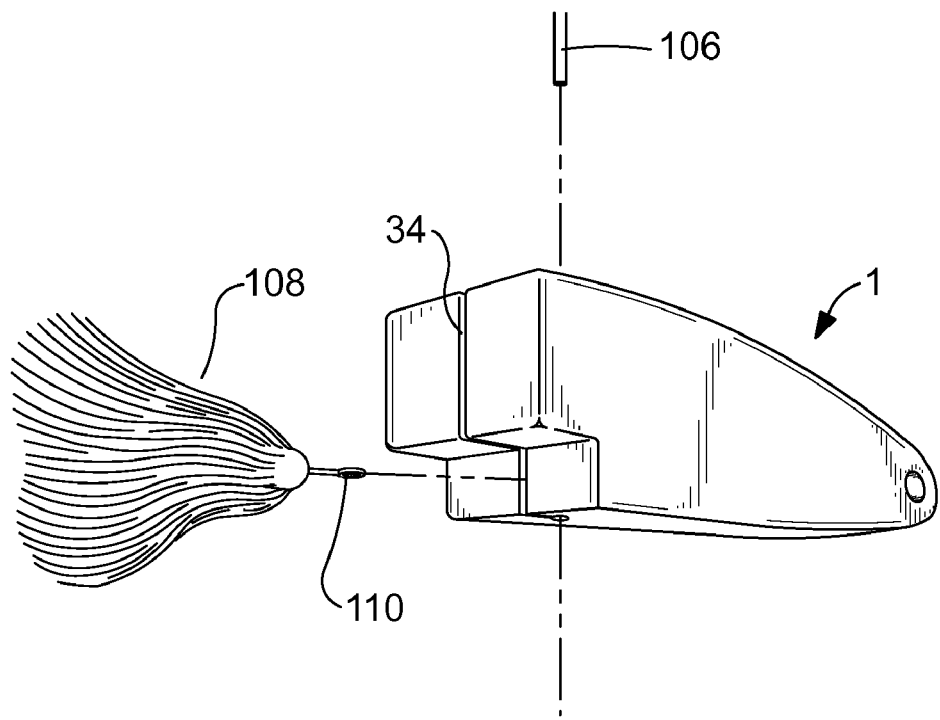
FIG. 14 is a perspective view of a fishing hook threader, a fly hook before insertion into the fishing hook threader and a fishing line before insertion into the fishing hook threader in accordance with the present invention.

A line removal slit 34 is formed through a wall of the line bore 20 or the conical shaped insert 26 and the line bore 20'. With reference to FIGS. 6-7, the line removal slit 34 allows the hook 100 and the fishing line 106 threaded through the inner perimeter 104 of the line loop 102 to be removed from the fishing hook threader 1. The memory properties of the threader body 10 material exert force against the hook 100, while in the line removal slit 34. A jig clearance notch 36 is formed in a front of the threader body 10, 10', below the conical shaped opening 14 or the conical shaped insert 26. A depth of the jig clearance notch 36 provides a wall thickness between the line bore 20, 20' and the jig clearance notch 36, which is equal to at least one diameter of the line bore 20, 20'. A chain hole 25 may be formed through a width of the threader body 10, 10' for retention on a key chain. With reference to FIGS. 12-14, the jig clearance notch 36 allows a line loop 110 extending from a fly jig 108 or a line loop 114 extending from a jig 112 to be inserted into the line bore 20, 20'.

In use, a line loop 102 of the fishing hook 100, the line loop 110 of the fly jig 108 or the line loop 114 of the jig 112 is inserted into the line removal slit 34, such that the line loop 102, 110, 114 is in contact with the line bore 20, 20'. However, the fly jig 108 and the jig 112 are inserted into the line removal slit in the jig clearance notch 36. A fishing line 106 is inserted through the conical shaped opening 14 or the conical shaped insert 26 and the line bore 20, 20'. The fishing line 106 is inserted through the line loop 102, 110, 114 and out of the line bore 20, 20'. The threader body 10 is fabricated from a resilient material having memory properties.

With reference to FIG. 5a, a perimeter of the line bore 20, 20' expands and has the non-obvious result of making an inner perimeter of the line loop 102, 110, 114 concentric with the line bore 20, 20' even though the line loop 102, 110, 112 is interrupted by a shank of the fishing hook 100, fly jig 108 or jig 112. The hoop tension of the line bore 20, 20' retains the line loop 102, 110, 114 in the line bore 20, 20', such that the fishing hook 100, fly jig 108 or jig 112 does not have to be held during threading of their respective line loop 102, 110, 114. The memory properties of the opposing sides of the slit 34 also retain the shank of the hook 100 by exerting opposing forces thereupon. The fishing hook 100, fly jig 108 or jig 112 and the fishing line 106 are removed from the line removal slit 34.

Figure 15:
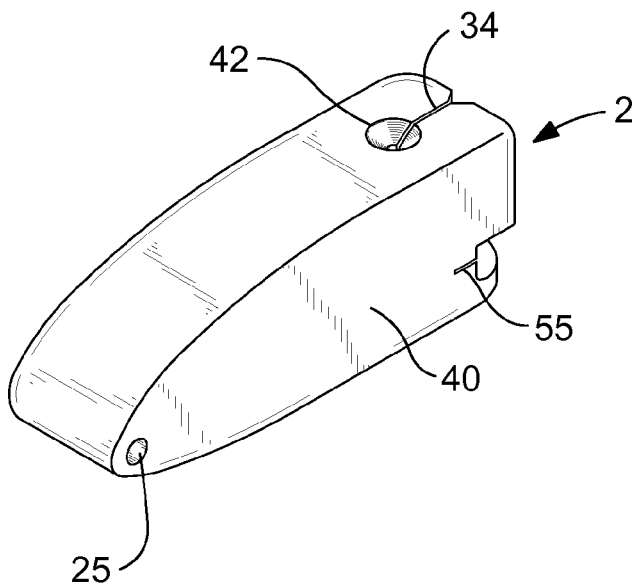
FIG. 15 is a rear perspective view of a second embodiment of a fishing hook threader in accordance with the present invention.
Figure 16:
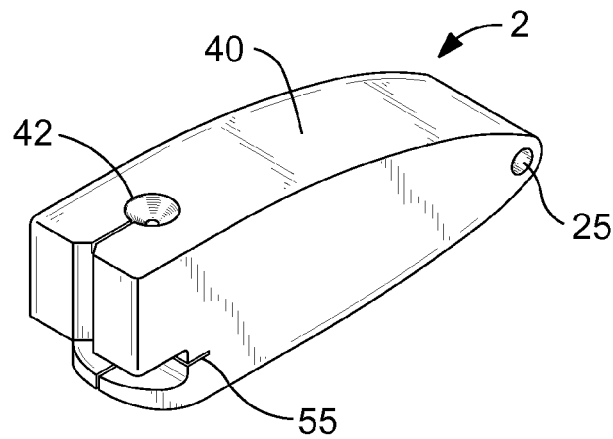
FIG. 16 is a front perspective view of a second embodiment of a fishing hook threader in accordance with the present invention.
Figure 17:
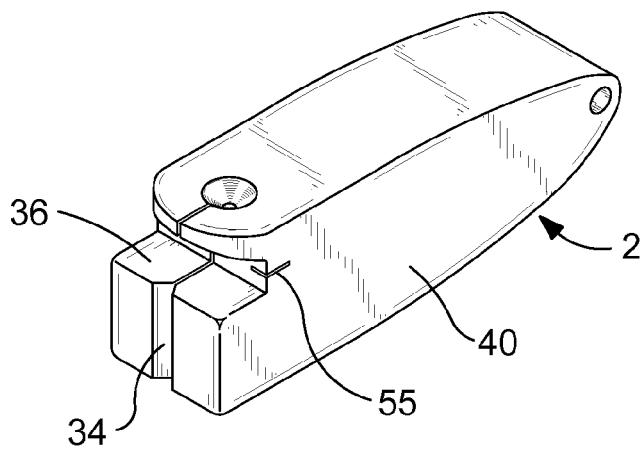
FIG. 17 is a front bottom perspective view of a second embodiment of a fishing hook threader in accordance with the present invention.
Figure 17A:
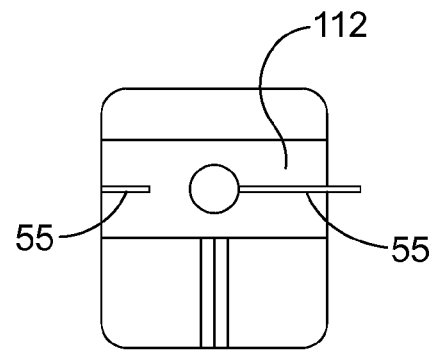
FIG. 17a is an end view of a second embodiment of a fishing hook threader with a jig retained therein in accordance with the present invention.
Figure 18:
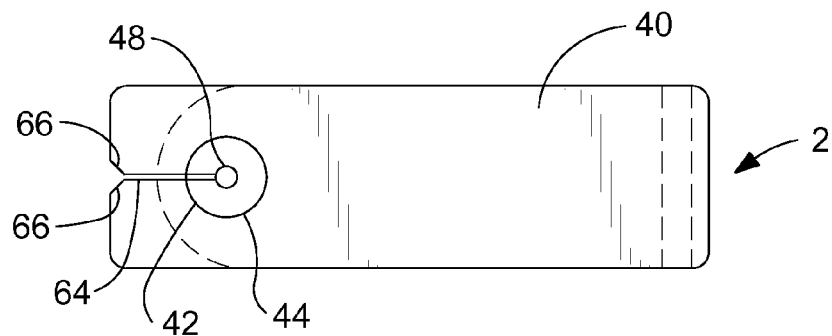
FIG. 18 is a top view of a second embodiment of a fishing hook threader in accordance with the present invention.
Figures 19, 20:
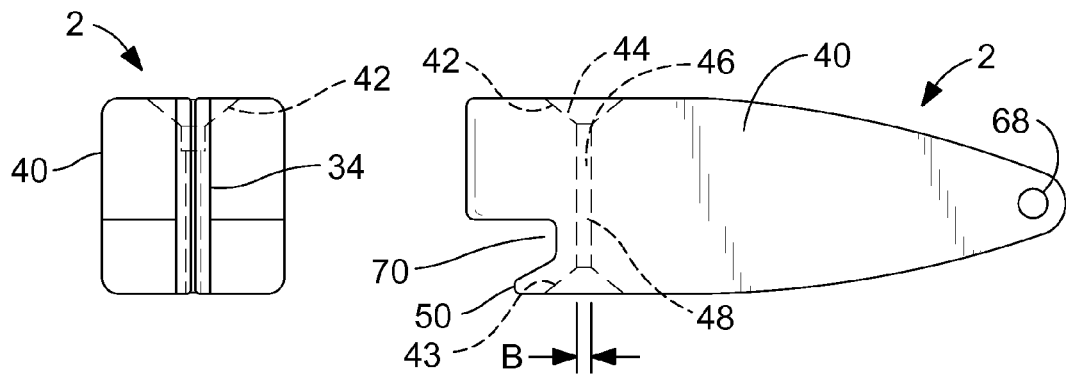
FIG. 19 is a front view of a second embodiment of a fishing hook threader in accordance with the present invention.
FIG. 20 is a side view of a second embodiment of a fishing hook threader in accordance with the present invention.
Figures 19A, 20A:
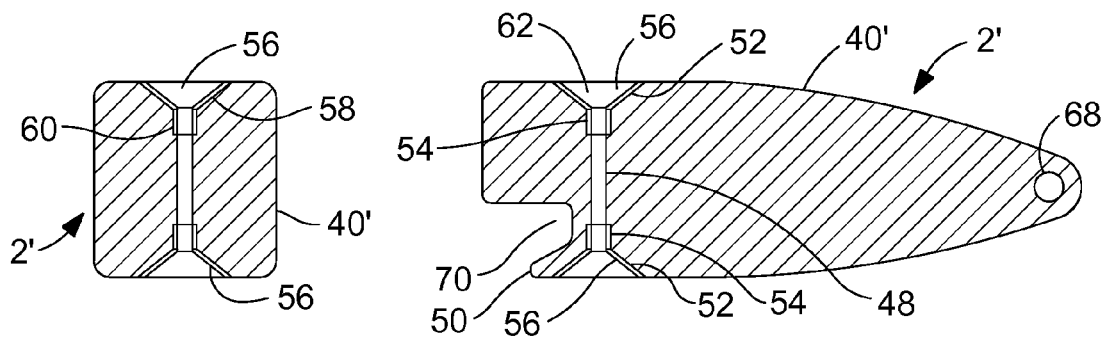
FIG. 19a is a cross sectional front view of a second embodiment of a fishing hook threader with two conical shaped inserts retained therein in accordance with the present invention.
FIG. 20a is a cross sectional side view of a second embodiment of a fishing hook threader with two conical shaped inserts retained therein in accordance with the present invention.
Figure 21:
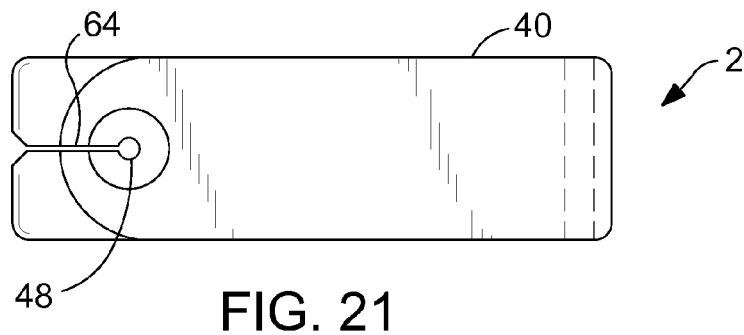
FIG. 21 is a bottom view of a second embodiment of a fishing hook threader in accordance with the present invention.

With reference to FIGS. 15-17, a second embodiment of a fishing hook threader 2 includes a threader body 40. The threader body 40 is fabricated from a material having memory, such as a rubber or a closed cell foam material, but other materials may also be used. A jig projection 50 extends from a bottom of the threader body 40. With reference to FIG. 17a, at least one hook slit 55 is preferably formed in the threader body 40, above the jig projection 50 to receive a hook and hook shank of the jig 112. It is also preferable that the fishing hook threader 2 be fabricated of a material that floats in water. A shape of the threader body 40 should not be limited to that shown in the figures, but should include any appropriate shape.

With reference to FIGS. 18-21, a conical shaped opening 42 is formed in a top of the threader body 40 at substantially one end. The conical shaped opening 42 includes an entrance opening 44 and exit opening 46. The entrance opening 44 has a greater perimeter than the exit opening 46. A line bore 48 is formed through the exit opening 46 and is concentric therewith. A diameter "B" of the line bore 48 is equal to substantially double a diameter of a fishing line 106 inserted therein. The jig projection 50 provides enough material for a second conical shaped opening 43 to be formed opposite the conical shaped opening 42.

A conical shaped opening 52 and a concentric counterbore 54 may be formed in a threader body 40' of a fishing hook threader 2' to receive a conical shaped insert 56. The conical shaped insert 56 includes a funnel portion 58 and a cylindrical portion 60. An inner diameter 62 of the cylindrical portion 60 is substantially the same size as the line bore 48. The cylindrical portion 60 helps align and prevent a fishing line 106 inserted through the conical shaped insert 56 from hitting a wall of the line loop 102.

A line removal slit 64 is formed through a wall of the line bore 48 or the conical shaped insert 56. An entrance of the line removal slit 64 preferably includes two entrance chamfers 66 to facilitate insertion of the line loop 102. The line loop 102 of the fishing hook 100 is inserted between the two entrance chamfers 66 and then into the line removal slit 64 as shown in FIGS. 6-7. The memory properties of the threader body 40 material exert force against the hook 100, while in the line removal slit 34. A chain hole 68 may be formed through a width of the threader body 40, 40' for retention on a key chain. The fly jig 108 or jig 112 are inserted into the line removal slit located in a jig clearance notch 70. The fishing hook threader 2 is used the way same as the fishing hook threader 1.

With reference to FIGS. 22-23, a fishing hook holder 72 preferably includes a base plate 74 and two resilient outer layers 76. The two resilient outer layers 76 have the property of memory. One of the two outer layers 76 is attached to one side of the base plate 74 with any suitable process, such as adhesive bonding and the other one of the two outer layers 76 is attached to the other side of the base plate 74 with the same suitable process. A hook opening 78 is formed through the base plate 74 and the two outer layers 76. A base slot 80 extends from a perimeter of hook 78 opening in the base plate 74 to provide clearance for the fishing hook 100. An outer slit 82 extends from a perimeter of hook opening 78 in the base plate 74 to provide an interference fit with the fishing hook 100. The base plate 74 is preferably fabricated from a magnetizable material or magnetized material, such as steel or a refrigerator type magnet. The fishing hook holder 72 is grasped between a thumb and forefinger.

With reference to FIGS. 24-25, a fishing hook holder 72' is formed by inserting a high strength magnetic disc 84 into a base plate 74'. The high strength magnetic disc 84 is preferably a neodymium magnet. The magnetic disc 84 helps retain the hook 100 in an upright position for tying a fishing line 106 to the hook loop 102.

With reference to FIGS. 26-27, a hook holder projection 86 includes a base plate 88 and two resilient outer layers 90. The two resilient outer layers 90 have the property of memory. A hook 92 opening is formed through the base plate 88 and the two outer layers 90. A base slot 94 extends from a perimeter of hook opening 92 in the base plate 88 to provide clearance for the fishing hook 100. An outer slit 96 extends from a perimeter of hook opening 92 in the outer layer 90 to provide an interference fit with the fishing hook 100. The base plate 88 is preferably fabricated from a magnetizable material or magnetized material, such as steel. A pair of retention projections 98 preferably extend from opposing ends of the base plate 88.

With reference to FIGS. 28-29, a fishing hook holder and threader 3 includes a threader body 40 and the hook holder projection 86. A holder cavity 120 is formed in a top of the threader body 40 to receive the base plate 88 of the hook holder projection 86. The pair of retention projections 98 help retain the base plate 88 in the holder cavity 120. Other methods of retaining the base plate 88 in the holder cavity 120 may also be used, such as adhesive bonding.

Figure 30:
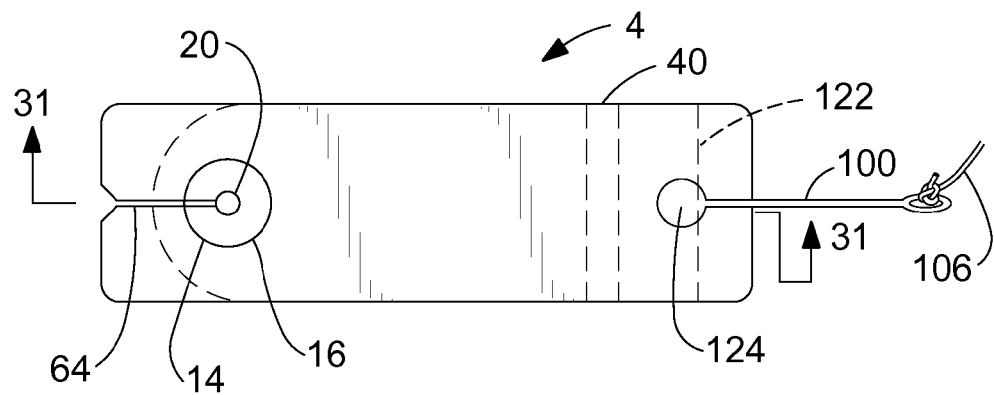
FIG. 30 is a top view of a fishing hook threader with an integral hook holder and a fishing hook retained therein in accordance with the present invention.
Figure 31:
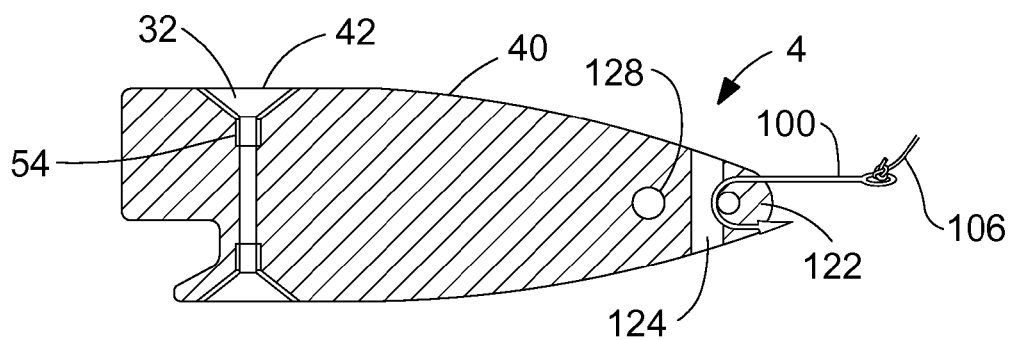
FIG. 31 is a cross sectional view cut through FIG. 30 of a fishing hook threader with an integral hook holder and a fishing hook retained therein in accordance with the present invention.
Figure 32:
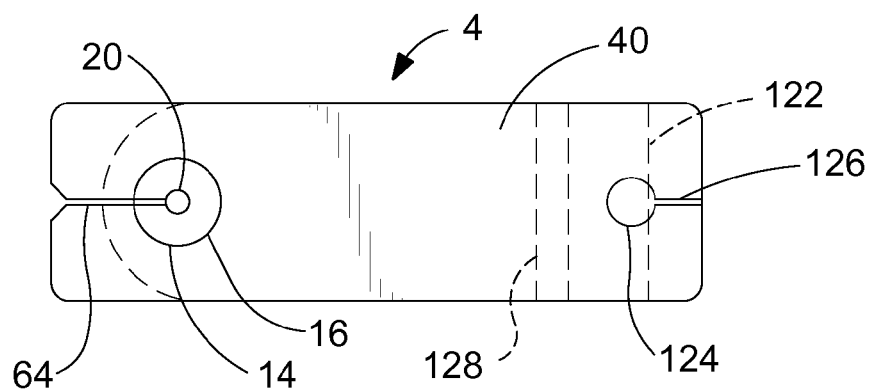
FIG. 32 is a top view of a fishing hook threader with an integral hook holder in accordance with the present invention.

With reference to FIGS. 30-32, a fishing hook threader with integral hook holder 4 includes a threader body 40 and a retention pin 122. A hook opening 124 is formed through a top of the threader body 40, adjacent an end thereof. A hook slit 126 is cut from an end of the threader body 40 through the hook bore 124.

The retention pin 122 is inserted substantially perpendicular to the hook bore 124 and adjacent to the hook opening 124. It is preferable that a barbed end of the hook extend out of the threader body 40. A chain hole 128 may be formed through a width of the threader body 40. The fishing hook 100, jig hook or fly hook is inserted into the hook bore 124 and pulled back against the retention pin 122. The memory properties of the threader body 40 material exert force against the hook 100, while in the hook slit 126. The fishing line may now be tied to the fishing hook 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A fishing hook threader comprising:
   a threader body is fabricated from a material having memory;
   a conical shaped opening is formed in at least one surface of said threader body, said conical shaped opening including an entrance opening that has a greater perimeter than an exit opening;
   a line bore is formed through said threader body and substantially concentric with said conical shaped opening, a jig clearance notch is formed in said threader body adjacent said line bore; and
   a line removal slit is formed through said threader body such that it communicates with said line bore, wherein a line loop of a hook is inserted into said line removal slit.

2. The fishing hook threader of claim 1 wherein:
   a jig projection extends from a bottom of the threader body adjacent the jig clearance notch, a second conical shaped opening is formed in said jig projection.

3. The fishing hook threader of claim 1 wherein:
   a depth of said jig clearance notch allowing a wall thickness between said line bore and said jig clearance notch, which is equal to at least one diameter of said line bore.

4. The fishing hook threader of claim 1, further comprising:
   a conical shaped insert is inserted into said conical shaped opening, said conical shaped insert including a funnel portion and a cylindrical portion extending from said funnel portion.

5. The fishing hook threader of claim 1 wherein:
   an entrance of said line removal slit includes two entrance chamfers to facilitate insertion of the line loop.

6. The fishing hook threader of claim 1 wherein:
   a hook holder projection includes a base plate and two outer layers, a hook opening is formed through said base plate and said two outer layers, a base slot extends from a perimeter of said hook opening in said base plate, an outer layer slit extends from a perimeter of said hook opening in said outer layer, one of said two layers is attached to one face of said base plate and the other one is attached to an opposing face of said base plate.

7. The fishing hook threader of claim 1 wherein:
   said threader body is fabricated from one of a rubber and a closed cell foam having memory properties.

8. The fishing hook threader of claim 1 wherein:
   said threader body is fabricated from a material that floats in water.

9. The fishing hook threader of claim 1 wherein:
   a retention pin is retained in an end of said threader body, a hook opening is formed through said end of said threader body adjacent said retention pin, a slit is formed through said hook opening from an end of said threader body.

10. A fishing hook threader comprising:
    a threader body is fabricated from a material having memory;
    a conical shaped opening is formed in at least one surface of said threader body;
    a line bore is formed through said threader body and substantially concentric with said conical shaped opening;
    a jig clearance notch is formed in said threader body adjacent said line bore; and
    a line removal slit is formed through said threader body such that it communicates with said line bore, wherein a line loop of a hook is inserted into said line removal slit.

11. The fishing hook threader of claim 10 wherein:
    a jig projection extends from a bottom of the threader body adjacent the jig clearance notch, a second conical shaped opening is formed in said jig projection.

12. The fishing hook threader of claim 10 wherein:
    a depth of said jig clearance notch allowing a wall thickness between said line bore and said jig clearance notch, which is equal to at least one diameter of said line bore.

13. The fishing hook threader of claim 10, further comprising:
    a conical shaped insert is inserted into said conical shaped opening, said conical shaped insert including a funnel portion and a cylindrical portion extending from said funnel portion.

14. The fishing hook threader of claim 10 wherein:
    an entrance of said line removal slit includes two entrance chamfers to facilitate insertion of the line loop.

15. The fishing hook threader of claim 10 wherein:
    a retention pin is retained in an end of said threader body, a hook opening is formed through said end of said threader body adjacent said retention pin, a slit is formed through said hook opening from an end of said threader body.

16. The fishing hook threader of claim 10 wherein:
    said threader body is fabricated from a material that floats in water.

* * * * *